P. A. HERBERT.

ANIMAL TRAP.

No. 9,867. Reissued Sept. 13, 1881.

Attest.
Thos. W. Layman
William Schmal.

Inventor.
Paule A. Herbert
by James H. Layman
Attorney.

N. PETERS. Photo-Lithographer, Washington, D. C.

UNITED STATES PATENT OFFICE.

PAULE A. HERBERT, OF CINCINNATI, OHIO.

ANIMAL-TRAP.

SPECIFICATION forming part of Reissued Letters Patent No. 9,867, dated September 13, 1881.

Original No. 191,052, dated May 22, 1877. Application for reissue filed July 9, 1881.

*To all whom it may concern:*

Be it known that I, PAULE A. HERBERT, of Cincinnati, Hamilton county, Ohio, but formerly a resident of New Orleans, Louisiana, have invented certain new and useful Improvements in Animal-Traps, of which the following is a specification.

My trap consists, essentially, of a suitable platform or base provided with an upright standard or stem carrying a lateral beam, to which the trip-lever and trigger are pivoted, said trigger being prolonged down to the platform and passed through a slot or opening in the wire cage that imprisons the animal. This cage is formed of numerous small wires attached to a frame, terminating in two coils, so as to render said frame capable of having a spring action, said coils and the two fixed ends of the spring-frame being secured to the standard near its base. Furthermore, the free end of this spring-frame has a trip-link or shackle that engages over the trip-lever, the arrangement of said link, lever, trigger, and frame being such that when the trap is properly set and baited any tampering with the bait will instantly cause the spring-frame to fly down, and thereby imprison the animal beneath the wire cage attached to said frame, as hereinafter more fully described. The retention of the animal is rendered still more effectual by providing the upper surface of the platform with a row of sharp-pointed spikes placed in close proximity to the outside of the spring-frame, as hereinafter more fully described.

Figure 1:
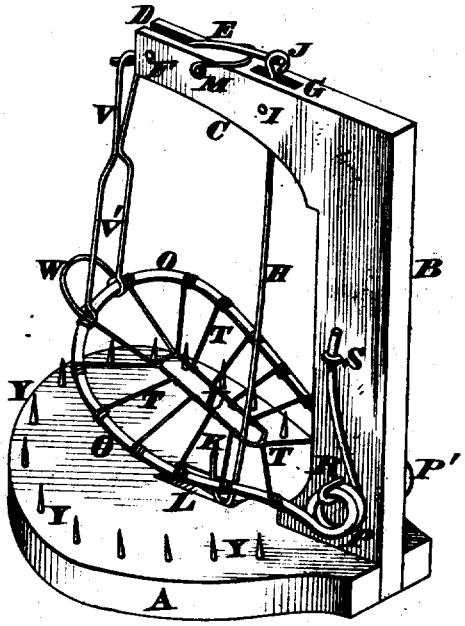
Figure 2:
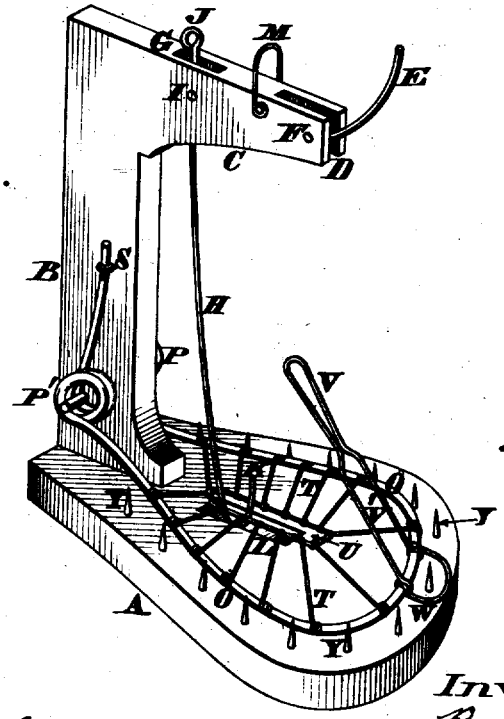

In the annexed drawings, Figure 1 is a perspective view, showing the trap set for the purpose of catching game. Fig. 2 is another perspective view, but showing the position the various parts assume when the trap is sprung.

A represents the base or platform, from which projects a rigid standard or stem, B, that carries a lateral extension or arm, C, the outer end of which latter is slotted at D to receive the swinging trip-lever E, that turns on the pivot F. Furthermore, the arm or beam C is mortised at G to admit the trigger H, which depends from a pivot, I, the upper end of said trigger having an eye, J, while its lower end is bent so as to constitute a bait-hook, K. Any material lateral play of this hook is prevented by causing it to traverse a concavity or recess, L, in the upper surface of the base-block A.

Coupled to beam C is a loop, M, capable of being engaged over the end of trip-lever E when it is desired to lock the latter for the time being.

O represents a stout wire frame, bent to the desired shape and terminating with two coils, P P′, which coils are fastened to standard B with staples R. The ends of this frame that project beyond said coils are carried upwardly and fastened to the standard by staples S. Secured to this frame is a cage composed of numerous small wires, T, so arranged as to leave a slot or opening, U, for the lower end of the trigger H to swing in.

V V′ represents a shackle or trip-link, capable of being engaged over the shorter arm of trip-lever E after the spring-frame O has been lifted by the ring-handle W.

Y are the spikes, arranged in a row along the outside of frame O, and projecting upwardly from the platform A.

To set my trap the longer arm of trip-lever E is swung down and engaged with the detent J of trigger H, after which act the cage O T is lifted by the handle W, and the shackle V is suspended from the shorter arm of said lever E, as seen in Fig. 1. The cage being thus elevated allows a rat or other animal to have free access to the bait on hook K, and the instant this hook is tugged at the detent J slips off from the end of trip-lever E and allows the cage O T to fly down with great force and imprison the animal beneath it, or else kills the rat by the violence of the blow; but if the animal should not be killed outright it will be impaled on the spikes Y, and thus retained until dispatched.

I claim as my invention—

1. The combination, in an animal-trap, of the base A, fixed stem B, lateral beam C, pivoted trip-lever E F, vibrating trigger H I J, shackle V, cage T, and swinging frame O, having spring-coils P P′ fastened to a fixed member of the trap, said cage being slotted at U to permit the proper play of said trigger, as described, and for the purpose set forth.

2. In combination with the swinging spring-cage O P P′ T of an animal-trap adapted to operate as described, the spikes Y, projecting upwardly from the base A and arranged in a row outside of the frame O of said cage, for the purpose described.

3. The animal-trap herein described, composed of a spiked platform, A Y, recessed at L and provided with a rigid standard, B, on each side of which are secured the springs P P′ of a wire-cage, O T, which latter is furnished with a link or shackle, V, for engagement with one end of a trip-lever, E, pivoted in the beam C, and operated by the trigger H I J, as described, and for the purpose set forth.

In testimony of which invention I hereunto set my hand.

PAULE AUGUST HERBERT.

Attest:
JAMES H. LAYMAN,
RANKIN D. JONES.